(12) United States Patent
Finn et al.

(10) Patent No.: US 7,214,423 B2
(45) Date of Patent: May 8, 2007

(54) WEAR RESISTANT FLUOROPOLYMER

(75) Inventors: Patrick J. Finn, Webster, NY (US); Dennis M. Dudek, Amity, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/753,549

(22) Filed: Jan. 8, 2004

(65) Prior Publication Data

US 2005/0153124 A1 Jul. 14, 2005

(51) Int. Cl.
  *B32B 15/06* (2006.01)
  *B32B 25/02* (2006.01)
  *G03G 15/14* (2006.01)
  *G03G 15/20* (2006.01)

(52) U.S. Cl. .................... 428/335; 428/339; 428/421; 428/457; 399/297; 399/320; 399/333

(58) Field of Classification Search ............... 428/35.7, 428/36.91, 334, 335, 339, 421, 457; 399/297, 399/308, 320, 333
See application file for complete search history.

(56) References Cited

U.S. PATENT DOCUMENTS

| | | | |
|---|---|---|---|
| 4,264,181 A | 4/1981 | Lentz et al. | 355/3 FU |
| 5,017,432 A | 5/1991 | Eddy et al. | 428/422 |
| 5,049,444 A | 9/1991 | Bingham et al. | 428/339 |
| 5,332,641 A | 7/1994 | Finn et al. | 430/124 |
| 5,456,987 A * | 10/1995 | Badesha | 428/421 |
| 5,729,813 A | 3/1998 | Eddy et al. | 399/333 |
| 5,998,033 A | 12/1999 | Tan et al. | 428/422 |
| 6,114,041 A | 9/2000 | Tan et al. | 428/421 |
| 2002/0102374 A1 * | 8/2002 | Gervasi et al. | 428/36.9 |
| 2003/0087175 A1 * | 5/2003 | Simpson et al. | 430/126 |
| 2004/0190941 A1 * | 9/2004 | Thornton et al. | 399/159 |

* cited by examiner

*Primary Examiner*—Ramsey Zacharia
(74) *Attorney, Agent, or Firm*—Perman & Green, LLP

(57) ABSTRACT

Disclosed is a fluoroelastomer loaded with an inorganic filler which is coupled to the fluoroelastomer by a titanate, zirconate or aluminate for use as a base layer and/or a release layer on a fuser, transfix, receiver or rheological transfer member in a copy machine. The coupled filler bonds tightly to the fluorocarbon matrix, significantly decreasing the wear rate of the member. These fillers also significantly increase the thermal conductivity of the compound as is often desirable in fusing applications.

14 Claims, No Drawings

WEAR RESISTANT FLUOROPOLYMER

BACKGROUND

1. Field

This disclosure relates to printing machines and to coatings for the fuser component of such machines which increase the durability of fluoroelastomer release layers on such components.

2. Brief Description of Related Developments

Fuser components using fluoroelastomer coatings often exhibit surface wear as a prime failure mode for both black and white and color applications. Black and white as well as many color xerographic machines use fluoroelastomers as the release surface in conjunction with functional release agents. Field experience with xerographic machines which have a thermally conductive fluoroelastomer release layer show paper edge wear of the fluoroelastomer is the primary failure mode, sometimes causing print quality concerns in as few as several hundred thousand prints. The fluoroelastomer coating is often worn through when the component is removed at several million prints. When used in color applications, gloss differential resulting from minor surface wear of the fluoroelastomer is a major cause of failure.

The art has long recognized the problems associated with fuser surface layer wear. Attempts have been made to increase the wear resistance of the fluoroelastomer coatings.

Eddy et al., U.S. Pat. No. 5,729,813, dated Mar. 17, 1998 and entitled Thin, Thermally Conductive Fluoroelastomer Coated Fuser Member discloses a thermally conductive fuser member comprising base member and a surface layer, where the surface layer comprises a fluoroelastomer and an alumina filler having an average particle size of from about 0.5 to about 15 micrometers.

Two patents to Tan et al attempt to solve the wear problem using a silane.

Tan et al., U.S. Pat. No. 5,998,033, dated Dec. 7, 1999 and entitled Fuser Member with Metal Oxide Fillers, Silane Coupling Agents, and Functionalized Release Fluids discloses a fuser member comprising a support and, coated thereon, a fluoroelastomer layer comprising a metal oxide filler and a silane coupling agent.

Tan et al., U.S. Pat. No. 6,114,041, dated Sep. 5, 2000 and entitled Fuser Member with Surface Treated $Al_2O_3$ and Functionalized Release Fluids discloses a fuser member comprising a support and coated thereon a fluoroelastomer layer comprising a metal oxide filler which had been previously interacted with a silane coupling agent.

It is an object of this disclosure to provide a wear layer for fuser components.

It is an object of this disclosure to provide a wear layer for fuser components that provides an extended service life to such components.

SUMMARY

This disclosure consists of the discovery that a fluoroelastomer material loaded with a inorganic filler coupled with a titanate, zirconate or aluminate provides superior functionality when used as a base layer and/or a release layer on a fuser or pressure member, transfix member, rheological transfer member, ink receiver or conditioner.

The titanate, zirconate or aluminate bonds the filler to the fluorocarbon matrix, significantly increasing the adhesiveness of the bond and decreasing the wear rate of the member. Additionally, these fillers significantly increase the thermal conductivity of the compound as is often desirable in fusing applications.

DETAILED DESCRIPTION OF THE EMBODIMENT(S)

The disclosed compositions comprise a fluoroelastomer selected from conventional fluoroelastomers such as those disclosed in Eddy et al., U.S. Pat. No. 5,017,432, the disclosure of which is incorporated herein and made a part hereof, as being suitable for toner components; a filler selected from $Al_2O_3$, CuO, SiC, and AlN, optional colorants such as carbon black and other fillers such as those disclosed in Lentz et al., U.S. Pat. No. 4,264,181, the disclosure of which is incorporated herein and made a part hereof; and a novel coupling agent selected from titanates, zirconates and aluminates and a curing system selected from those cure systems conventionally used to cure such compositions, such as peroxide, amine such as, for example, Diak #1, a 6-aminohexyl carbamic acid curing agent manufactured by DuPont Dow Elastomers LLC, Wilmington, Del. 19809, or Diak #3, a N,N'-dicinnamylidene-1,6-hexanediamine curing agent manufactured by DuPont Dow Elastomers LLC, Wilmington, Del. 19809, amino silane or Bisphenol A.

Various embodiments add titanates, zirconates, or aluminates to improve the wear resistance of fluoroelastomers loaded with inorganic fillers. The titanate, zirconate, or aluminate additives act as coupling agents, improving the bonding of the fillers to the fluorocarbon matrix. This strengthened bonding increases the wear resistance of the resulting coating.

The inventive compositions have been wear tested. The results obtained demonstrate that the addition of the titanate, zirconate, or aluminate coupling agent increased wear resistance by as much as 15% over the uncoupled material.

The compositions comprise a fluoropolymer, at least one filler, and, alone or in combination, a titanate, zirconate, or aluminate coupling agent.

The fluoroelastomer is easily formulated by one skilled in the art. A description of suitable fluoropolymers appears in Eddy et al., U.S. Pat. No. 5,017,432 dated May 21, 1991 and entitled Fuser Member, the disclosure of which is incorporated herein and made a part of this present application.

The filler is chosen for its hardness and thermal conductivity (conductivity should be several times greater than the base elastomer). $Al_2O_3$, CuO, ZnO, SiC or aluminum nitride are examples of suitable fillers. Filler loadings of up to 35 volume percent are typical. Often fractions of a part to several parts of carbon black, is added to the formulation to color the coating black or dark grey. Often a filler(s) such as those described Lentz et al., U.S. Pat. No. 4,264,181, is added to the material to aid reaction with the functional oil. Fillers with a mohr hardness of 3 to 10 are other suitable fillers.

The filler(s) may be treated with the titanate, zirconate or aluminate in the compound by addition to the fluoroelastomer and filler at the rate of from about 0.001% to about 5% by weight, preferably from about 0.05% to about 0.5% by weight, most preferably from about 0.1% to about 0.3% by weight. Alternatively, the filler may be pretreated before adding to compound by techniques known to those skilled in the art. An schematic representation of one such typical pretreatment technique is shown in FIG. 11B of the Ken-React Reference Manual, Bulletin KR 0395 [page 6, see also pages 28–29].

The cure system may be a peroxide, amine amino silane or Bisphenol A type. The Bisphenol A type is generally, but not always, preferred for its ease of processing by solution coating. For a Bisphenol A cure, DuPont VC 50 [a mixture of organophosphonium salt and a dihydroxy compound] with approximately 1 part of $Ca(OH)_2$ and 2 parts of MgO is generally preferred, but is not limited to this level. In other applications, as high as 30 parts of MgO have been used.

The material may be physically compounded by conventional mechanical mixing (e.g. roll mill, Banbury or extruder). The coating may be then formed by molding, extruding and/or wrapping the material at a time and temperature sufficient to cure the material. The cure time is dependent on the specific formulation and needs to be adjusted for each formulation. Typical times and temperatures are in the range of from about 5 minutes to about 8 hours at a temperature in the range of from about 300° C. to about 375° C.

Alternately coatings may be formed from solutions of the fluoroelastomer compound. The solution may be formed by solvating conventionally mixed material in a compatible solvent such as MEK, MIBK, MAK, acetone or hexafluorobenzene. Alternately, the material may be mixed by adding the ingredients to a compatible solvent such as MEK and/or MIBK, MAK, acetone or hexafluorobenzene and solvating the fluoroelastomer in place with the ingredients of the formulation. In either case the solvated fluoroelastomer can then be applied by methods of spray, dip, ring or curtain coating or, in a preferred procedure, by flow coating.

After desolvation these coatings are cured and post cured.

The coating may be applied to hard or elastomeric, inorganic or organic substrates. The composition may function as a unitary element; i.e. the coating may be the substrate as well as the release layer of the element (as in the case of a belt).

Where the coating is applied to a hard substrate, the coating thickness is typically, but not limited to, from about 5 μm to about 6.4 mm, preferably from about 100 to 300 μm. Where the coating is applied to an elastomeric substrate, the coating thickness is typically, but not limited to, from about 5 μm to about 100 μm, preferably from about 15 to about 55 μm. Where the composition functions as a unitary element, the component thickness is typically, but not limited to, from about 75 μm to about 6.5 mm, preferably from about 1 mm to 5 mm.

Adhesives for the above coatings are known to the art. Appropriate adhesives such as an adhesive layer comprising a copolymer of vinylidene fluoride and hexafluoropropylene and at least 20% by weight of the adhesive layer of a coupling agent comprising at least one organo functional silane are described in Bingham et al., U.S. Pat. No. 5,049,444 dated Sep. 17, 1991 and entitled Silane Adhesive System For Fusing Member, the disclosure of which is incorporated herein and made a part of this application. Other suitable adhesives are described in Finn et al., U.S. Pat. No. 5,332,641 dated Jul. 26, 1994 and entitled Fuser Member with an Amino Silane Adhesive Layer, the disclosure of which is incorporated herein and made a part of this application.

EXAMPLES

Various compositions as set forth in Table 1 were formulated and the wear resistance determined by an abrader utilizing a 8.73 mm round indentor, a load of 150 μm, 33 m of paper, at a temperature of 200° C.±7° C.

|  | #1 Base | #2 Base & TPP/H | #3 Base & L38/H | #4 Base & KA 322/H | #5 Base & KR 134SP/H |
|---|---|---|---|---|---|
| Viton GF | 100 | 100 | 100 | 100 | 100 |
| MgO | 3 | 3 | 3 | 3 | 3 |
| $Ca(OH)_2$ | 6 | 6 | 6 | 6 | 6 |
| VC 50 | 5 | 5 | 5 | 5 | 5 |
| $Al_2O_3$ | 46 | 46 | 46 | 46 | 46 |
| CuO | 15 | 15 | 15 | 15 | 15 |
| Ken-react KZ TPP/H |  | 0.21 |  |  |  |
| Ken-react L38/H |  |  | 0.2 |  |  |
| Ken-react KA 322/H |  |  |  | 0.2 |  |
| Ken-react KR 134SP/H |  |  |  |  | 0.2 |
| Wear | 84 μm | 72 μm | 76 μm | 80 μm | 82 μm |

Viton GF is DuPont-Dow's trademark for its fluoroelastomeric terpolymer of VF2/HFP/TFE.

Ken-react is the trademark of Kenrich Petrochemicals, Inc., 142 East 22$^{nd}$ Street, PO Box 32, Bayonne, N.J. 07002 for its mixtures of organoaluminates or organotitinates and silica sold under the designations KZ TPP/H, L38/H, KR 134SP/H, and KA 322/H.

Advantages are that the material can be loaded to be thermally conductive as in the above example. The material exhibits as much as 15% less wear than base case without titanate, zirconate or aluminate coupler or the base case in the paper abrader wear test as set forth FIG. 1. There is an expected 15% increase in the average life of the roll.

While particular embodiments have been described, various alternatives, modifications, variations, improvements, and substantial equivalents that are or may be presently unforeseen may arise to Applicant's or others skilled in the in the art. Accordingly, the appended claims as filed, and as they may be amended, are intended to embrace all such alternatives, modifications, variations, improvements and substantial equivalents.

The invention claimed is:

1. A coated printing machine component comprising a substrate and a cured wear resistant fluoroelastomeric coating composition comprising a fluoroelastomer, filler selected from SiC and AlN, and a coupling agent, where the coupling agent is selected from the group consisting of zirconates and aluminates and wherein the component is selected from the group consisting of fuser elements, transfix members, rheological transfer members, and ink conditioners and receivers.

2. The coated component of claim 1 where the substrate is a metal or a plastic.

3. The coated component of claim 2 where the coating is applied to the substrate to a thickness of from about 5 μm to about 6.4 mm.

4. The coated component of claim 2 where the coating is applied to the substrate to a thickness of from about 100 μm to about 300 μm.

5. The coated component of claim 1 where the substrate is an elastomer.

6. The coated component of claim 5 where the coating is applied to the substrate to a thickness of from about 5 μm to about 100 μm.

7. The coated component of claim 5 where the coating is applied to the substrate to a thickness of from about 15 μm to about 55 μm.

8. The coated component of claim 1 where there is an intermediate elastomer layer between the substrate and the coating.

9. The coated component of claim 1 where the coating is applied to the substrate by spray, dip or ring, curtain or flow coat, and desolvating, curing and post curing the coating.

10. The coated component of claim 9 where the coating is applied to the substrate by flow coat.

11. A printing machine component comprising a cured wear resistant fluoroelastomeric composition comprising a fluoroelastomer, filler selected from SIC and AlN, and a coupling agent, where the coupling agent is selected from the group consisting of zirconates and aluminates and wherein the component is selected from the group consisting of fuser elements, transfix members, rheological transfer members, and ink conditioners and receivers.

12. The component of claim 11 having a thickness of from about 75 μm to about 6.5 mm.

13. A coated printing machine component comprising a substrate and a cured wear resistant fluoroelastomeric coating composition comprising a fluoroelastomer, a filler selected from the group consisting of SIC and AlN, and a coupling agent, where the coupling agent is selected from the group consisting of, zirconates and aluminates and wherein the component is selected from the group consisting of fuser elements, transfix members, and ink conditioners and receivers.

14. The coated printing machine component of claim 13 where the coupling agent comprises from about 0.1% to about 0.3% by weight of the coating composition.

* * * * *